United States Patent
Song et al.

(10) Patent No.: US 8,688,120 B2
(45) Date of Patent: Apr. 1, 2014

(54) METHOD FOR HANDOVER IN MULTI-CARRIER SYSTEM

(75) Inventors: Pyeong Jung Song, Daejeon (KR); Jaesheung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/886,047

(22) Filed: Sep. 20, 2010

(65) Prior Publication Data

US 2011/0070880 A1 Mar. 24, 2011

(30) Foreign Application Priority Data

Sep. 21, 2009 (KR) .................. 10-2009-0089180
Sep. 20, 2010 (KR) .................. 10-2010-0092711

(51) Int. Cl.
*H04W 36/00* (2009.01)
*H04W 24/00* (2009.01)

(52) U.S. Cl.
USPC .......... 455/436; 455/423; 455/439; 370/331; 370/332

(58) Field of Classification Search
USPC .................. 455/423, 436–439; 370/331, 332
See application file for complete search history.

(56) References Cited

U.S. PATENT DOCUMENTS

| | | | |
|---|---|---|---|
| 6,246,876 B1* | 6/2001 | Hontzeas | 455/436 |
| 6,597,911 B1* | 7/2003 | Kransmo | 455/436 |
| 7,054,635 B1* | 5/2006 | Ritzen et al. | 455/444 |
| 2008/0233963 A1* | 9/2008 | Alanara et al. | 455/438 |
| 2009/0191862 A1* | 7/2009 | Amirijoo et al. | 455/424 |
| 2009/0274096 A1* | 11/2009 | Fu | 370/328 |
| 2009/0310563 A1* | 12/2009 | Chou et al. | 370/331 |
| 2010/0034163 A1* | 2/2010 | Damnjanovic et al. | 370/329 |
| 2010/0124201 A1* | 5/2010 | Griot et al. | 370/331 |
| 2011/0026492 A1* | 2/2011 | Frenger et al. | 370/331 |
| 2011/0183674 A1* | 7/2011 | Lee et al. | 455/436 |

OTHER PUBLICATIONS

Inuk Jung et al., "Multi-Carrier Supported Handover Procedures", IEEE 802.16 Broadband Wireless Access Working Group, Sep. 5, 2009, 7 pages.
Ruixia Zhang et al. "Intra-BS Carrier Handover for IEEE 802.16m", IEEE 802.16 Broadband Wireless Access Working Group, Sep. 5, 2009, 6 pages.

\* cited by examiner

*Primary Examiner* — Cong Tran
(74) *Attorney, Agent, or Firm* — Staas & Halsey LLP

(57) ABSTRACT

When a terminal moves from a serving cell to a target cell, the carrier in use is switched to the primary carrier of the serving cell and then handed over to the target cell. Hereupon, handover is performed by switching the carrier used by the terminal operating with the primary carrier of the serving cell to the primary carrier of the target cell to perform handover. When the terminal has fully entered the target cell, the best carrier is selected from among the carriers available to the target cell, thus allowing the terminal to perform frequency conversion to the best carrier.

8 Claims, 10 Drawing Sheets

METHOD FOR HANDOVER IN MULTI-CARRIER SYSTEM

CROSS-REFERENCE TO RELATED APPLICATION

This application claims priority to and the benefit of Korean Patent Application No. 10-2009-0089180 and No. 10-2010-0092711 filed in the Korean Intellectual Property Office on Sep. 21, 2009 and Sep. 20, 2010, the entire contents of which are incorporated herein by reference.

BACKGROUND OF THE INVENTION (a) Field of the Invention

The present invention relates to a method for handover in a wireless communication system using multiple carriers.

(b) Description of the Related Art

At present, an international mobile telecommunication (IMT)-Advanced system allows for higher data transfer rate, and enables one terminal to get more integrated services at a time. The integrated services, like a quadruple play service (QPS), may include internet telephone service, high-speed interactive service, large data transfer, mobility IP-TV, and so on.

To this end, it is recommended that an IMT-Advanced system uses a wide range of frequency from 400 MHz to 4 GHz. On the basis of this frequency band, one cell (or base station) in a wireless communication system can operate with a multi-component carrier for wider bandwidth.

However, in a cell that operates with multiple carriers in 3rd generation partnership project long term evolution (3GPP LTE) or institute of electrical and electronics engineers (IEEE) 16m, each carrier may have a different cell coverage according to frequency characteristics, such as bandwidth/duplex distance, or user policies, such as the number of operational carriers. As a result, a contiguous connection between adjacent cells is not provided but communication between cells may be interrupted, or data forwarding between carriers of a serving cell and a target cell cannot be performed in a handover step, thereby failing to perform a normal handover.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for efficiently performing handover in a wireless communication system using multiple carriers.

Furthermore, the present invention has been made in an effort to provide a method for handover using a primary carrier in a wireless communication system using multiple carriers.

According to an aspect of the present invention, there is provided a method for handover between cells using a plurality of carriers, the method including: switching a carrier used by a terminal in a serving cell into a primary carrier of the serving cell; and performing a handover for the terminal operating with the primary carrier of the serving cell to a target cell, wherein a cell comprises one primary carrier and at least one secondary carrier.

According to another aspect of the present invention, there is provided a method for handover of a terminal from a serving cell to a target cell, the method including: when the target cell includes one primary carrier and at least one secondary carrier, determining whether a cell coverage control of each carrier used in the target cell is possible; if the cell coverage control is not possible, when the terminal has entered the target cell, performing an intra inter-frequency handover (intra-IFHO) procedure for selecting a best carrier from among carriers with which the terminal operates and enabling the terminal to operate based on the best carrier; and if the cell coverage control is possible, performing a handover for switching a carrier with which the terminal operates to the primary carrier of the target cell.

According to still another aspect of the present invention, there is provided a method in which a base station performs handover within a cell using a plurality of carriers, the method including: receiving, from a terminal, measurement information including received signal strength information on carriers used in the cell; creating a candidate list including carriers available to the terminal based on the measurement information; checking at least one of accessibility of the terminal, resource availability of a carrier, and unit cost of a carrier for each carrier included in the candidate list; selecting a best carrier for the terminal based on results of checking on each of the carriers included in the candidate list; and requesting the terminal to switch to the best carrier.

DETAILED DESCRIPTION OF THE EMBODIMENTS

Figure 1:
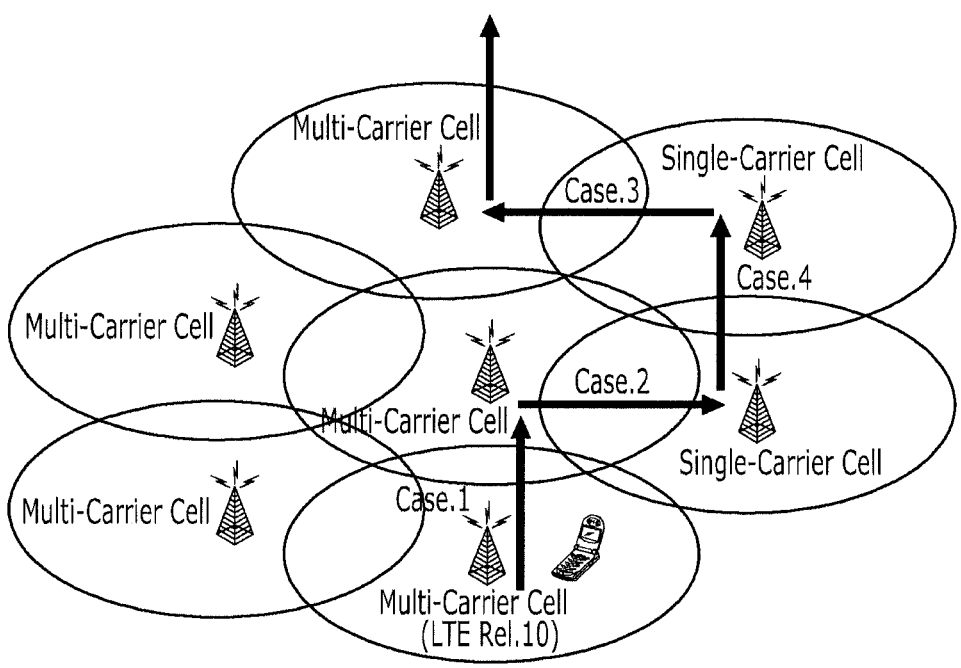
FIG. 1 is a view showing a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a multi-carrier refers to a multi-component carrier (hereinafter, referred to as MCC or multi-carrier). The multi-carrier includes a primary carrier and a secondary carrier. The primary carrier refers to a Backward Component Carrier (BCC) or Primary Component Carrier (PCC). The secondary carrier refers to a Non-Backward Component Carrier (NBC) or Secondary Component Carrier (SCC). The carrier may refer to a frequency a different situation.

The primary carrier refers to a Backward Component Carrier (BCC). The primary carrier is a carrier accessible by all terminals regardless of release version (e.g., LTE Rel.8 or LTE Rel.10), and ensures coverage continuity between adjacent cells. The multi-carrier includes at least one primary carrier.

The primary carrier (BCC) and the secondary carrier (NBC) may have a different number of downlink logs and uplink logs. Each carrier of a cell having multiple carriers may have a different cell coverage.

Each cell may transmit signals for each carrier, and has identification information for identifying the cell. As used herein, identification information of a cell may be global cell identification (GCI), but not necessarily limited thereto.

A terminal (UE) may contain one or more carriers, and may designate a mobile station (MS), a terminal, a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

The term "cell" may refer to a base station (BS) depending on the context in which the term is used, and, as used herein, a base station may designate a eNode B, an access point (AP), a radio access station (RAS), a base transceiver station (BTS), a mobile multi-hop relay (MMR)-BS, etc., and may include the entire or partial functions of the access point, the radio access station, the node B, the base transceiver station, the MMR-BS, etc.

Hereinafter, a method for handover in a multi-carrier system according to an exemplary embodiment of the present invention will be described with reference to the accompanying drawings.

FIG. 1 is a view showing a wireless communication system according to an exemplary embodiment of the present invention.

The wireless communication system shown in the accompanying FIG. 1 includes a multi-carrier cell having a multi-component carrier (MCC) and a single carrier cell having a single carrier. The single carrier refers to a Lone component carrier (LCC) or a single component carrier. A terminal can move through the multi-carrier cell or the single carrier cell. In FIG. 1, the arrows indicate the moving path of the terminal.

For example, in the course of movement of the terminal through four adjacent cells, there may occur: Case.1 in which the terminal moves from a multi-carrier cell to a multi-carrier cell; Case.2 in which the terminal moves from a multi-carrier cell to a single carrier cell; Case.3 in which the terminal moves from a single carrier cell to a multi-carrier cell; and Case.4 in which the terminal moves from a single carrier cell to a single carrier cell. Here, the multi-carrier cell may operate according to LTE Rel. 10 protocol, and the single carrier cell may operate according to LTE Rel. 8 protocol.

Figure 2:
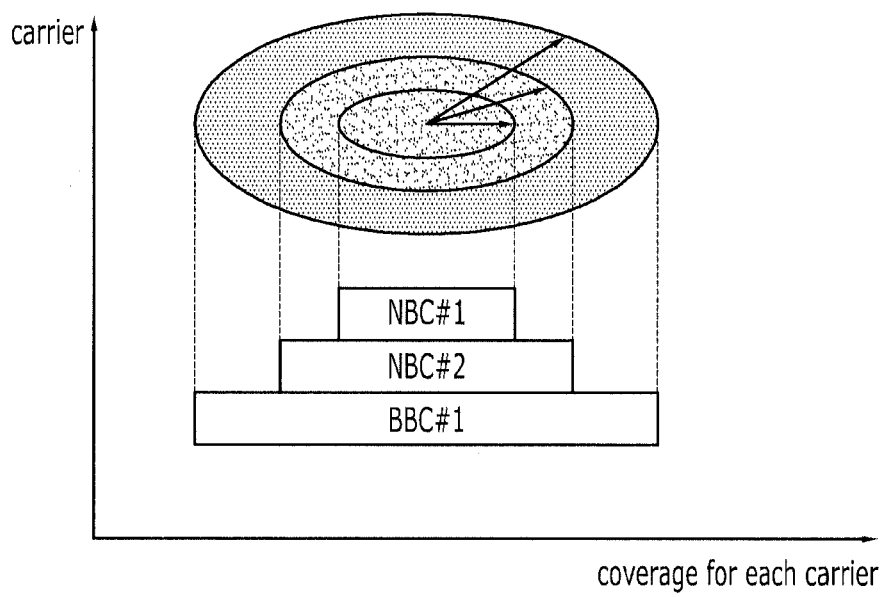
FIG. 2 is a view showing the number of carriers used in a multi-carrier cell and the cell coverage of each carrier.

FIG. 2 is a view showing the number of carriers used in a multi-carrier cell and the cell coverage of each carrier.

Multiple carriers used for a multi-carrier cell basically include a primary carrier type and a secondary carrier type. A multi-carrier cell may operate with three carriers, for example, as shown in FIG. 2. Among these three carriers, one carrier operates as a primary carrier BCC#1, and the other two carriers operate as secondary carriers NBC#1 and NBC#2. The primary carrier BCC#1 is a carrier accessible by all terminals regardless of release version, and ensures the continuity of coverage between adjacent cells.

The cell coverage of each carrier may vary according to frequency characteristics, such as bandwidth/duplex distance, or a service provider's policy, such as the number of operational carriers.

Figure 3:
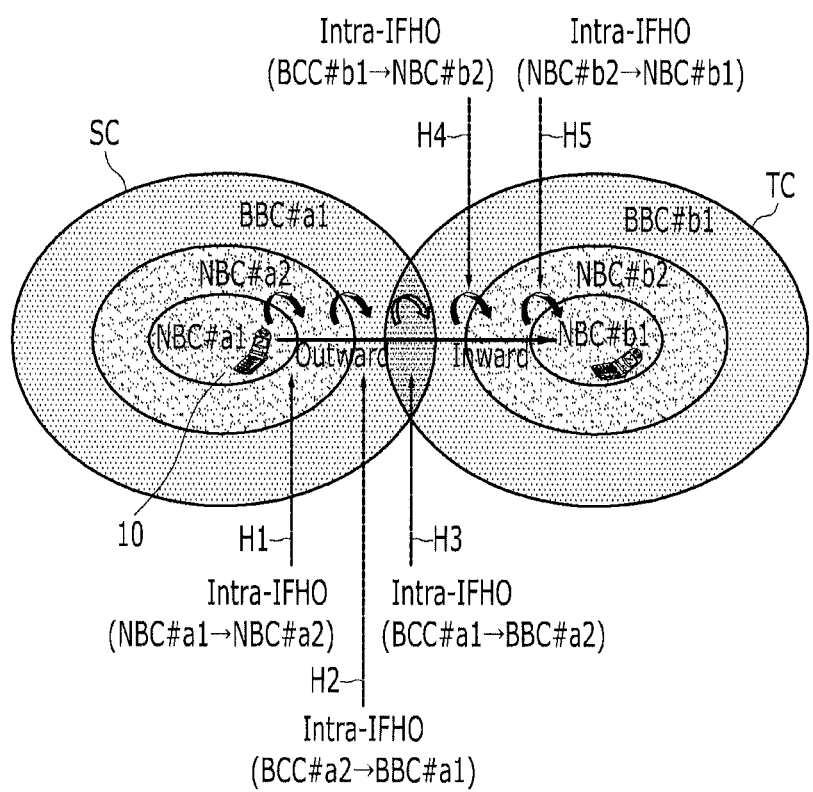
FIG. 3 is a view showing in steps a handover operation of a terminal according to an exemplary embodiment of the present invention.

FIG. 3 is a view showing in steps a handover operation of a terminal according to an exemplary embodiment of the present invention.

As shown in the accompanying FIG. 3, a handover may occur while a terminal 10 is moving from a serving cell SC to a target cell TC, and a series of handover operations H1 to H5 may be performed in a stepwise manner.

That is, a best carrier selection procedure H1 to H3, which takes place in an outward direction while the terminal 10 is moving out of the serving cell SC, and a best carrier selection procedure H4 and H5, which takes place in an inward direction while the terminal 10 is entering the target cell TC, may be performed in a stepwise manner.

Herein, handover assumes the serving cell SC and the target cell TC that operate with multiple carriers, and, as illustrated in FIG. 3, the best carrier selection procedure, which takes place in the outward direction while the terminal 10 is moving outward, includes a first intra inter-frequency handover (Intra-IFHO) (NBC#a1->NIBC#a2, H1), a second intra inter-frequency handover (NBC#a2->BCC#a1, H2), and an Inter inter-frequency handover (Inter-IFHO) (BBC#a1->BCC#b1, H3).

On the contrary, the best carrier selection procedure, which takes place in the inward direction while the terminal 10 is entering the target cell, includes a first intra-IFHO (BBC#b1->NIBC#b2, H4) and a second intra-IFHO (NBC#b2->NCC#b1, H5).

These handover operations will be described below in more detail.

Figure 4:
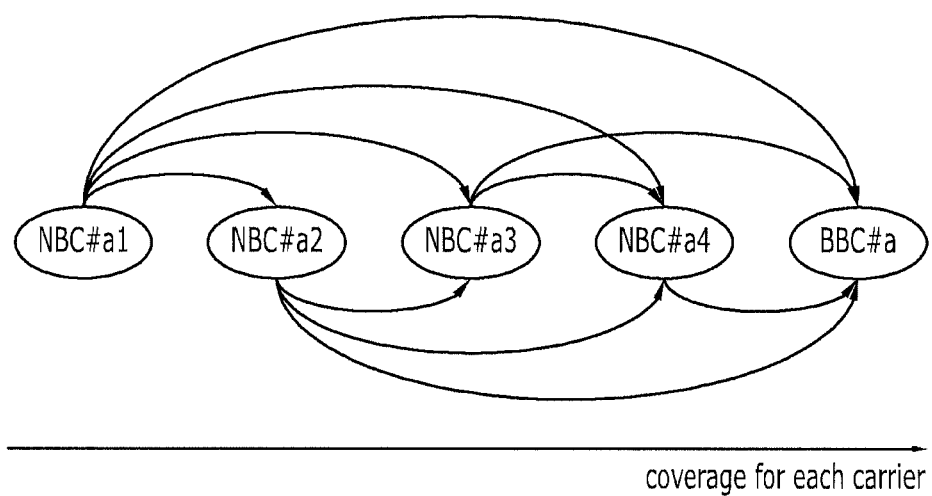
FIGS. 4 and 5 are views showing inter-cell handover operations according to an exemplary embodiment of the present invention.
Figure 5:
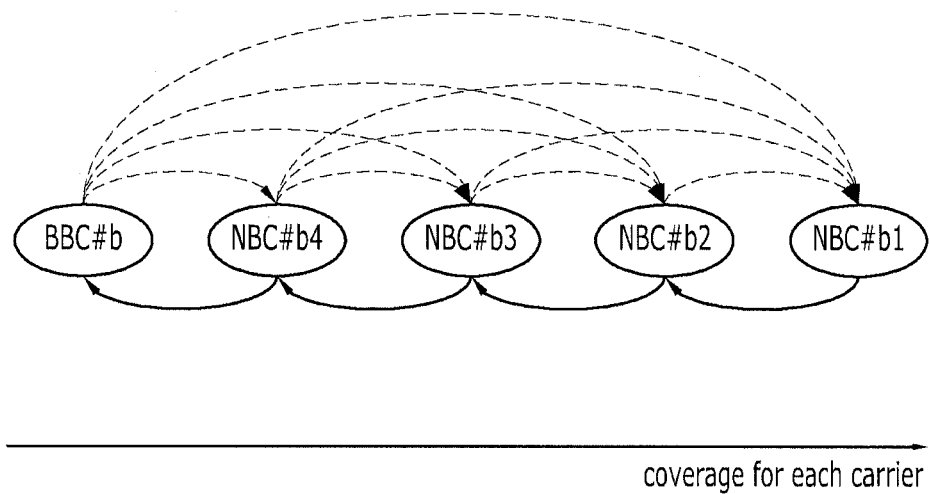

FIGS. 4 and 5 are views showing inter-cell handover operations according to an exemplary embodiment of the present invention. Specifically, in the first case (Case.1) where the terminal 10 moves from a serving cell SC, which is a multi-carrier cell, to a target cell TC, which is a multi-carrier cell, FIG. 4 illustrates a best carrier selection procedure which takes place in an outward direction while the terminal 10 is moving out of the serving cell SC, and FIG. 5 illustrates a best carrier selection procedure which takes place in an inward direction while the terminal 10 is entering the target cell TC. By way of example, the serving cell SC includes one primary carrier BCC#a and four secondary carriers NBC#a1-NBC#a4, and the target cell TC also includes one primary carrier BCC#b and four secondary carriers NBC#b1-NBC#b4.

In the accompanying FIG. 4, a certain carrier experiencing a decrease in received signal strength below a threshold can be switched to another adjacent carrier as the terminal 10 moves to an adjacent cell in an outward direction. For example, the secondary carrier (e.g., NBC#a1) can be switched to another adjacent secondary carrier NBC#a2, NBC#a3 or NBC#a4, or to the primary carrier BBC#a. As above, a procedure for switching from a certain carrier to another carrier within a cell may be referred to as an intra inter-frequency handover, that is, Intra-IFHO, and the intra-IFHO indicates handover from a current serving carrier to a certain target carrier based on carriers that can be used within a cell. One of a plurality of intra inter-frequency handovers in FIG. 4 for switching the current serving carrier to another carrier may be selectively performed. Such an intra-IFHO can be done by RF switching.

Even after the terminal 10 has fully entered the target cell TC, intra-inter handover (indicated in dotted lines) may occur based on the current serving carrier as the terminal 10 moves in an inward direction as shown in FIG. 5. Particularly, when the terminal 10 has fully entered the target cell TC, intra-inter frequency load balancing (Intra-IFLB) for distributing traffic based on a certain carrier to adjacent carriers is performed. The intra-IFLB is indicated in solid lines in FIG. 5.

In such a wireless communication system that operates with multiple carriers, the cell coverage for each carrier may vary according to frequency characteristics, such as bandwidth/duplex distance, or communication provider policies, such as the number of operational carriers. In this case, a contiguous connection to an adjacent cell is not provided but communication between cells may be interrupted, or data forwarding between carriers of a serving cell and a target cell cannot be performed in a handover step, thereby failing to perform normal handover. However, according to an exemplary embodiment of the present invention, communication interruption between multiple carriers caused by handover can be prevented by performing handover between the multiple carriers using the primary carrier of each cell.

Next, a method for handover according to an exemplary embodiment of the present invention will be described.

First, an intra-IFHO procedure, i.e., inter-cell handover method, which occurs as the terminal 10 moves within a cell in an outward direction or in an adjacent direction will be described first.

Figure 6:
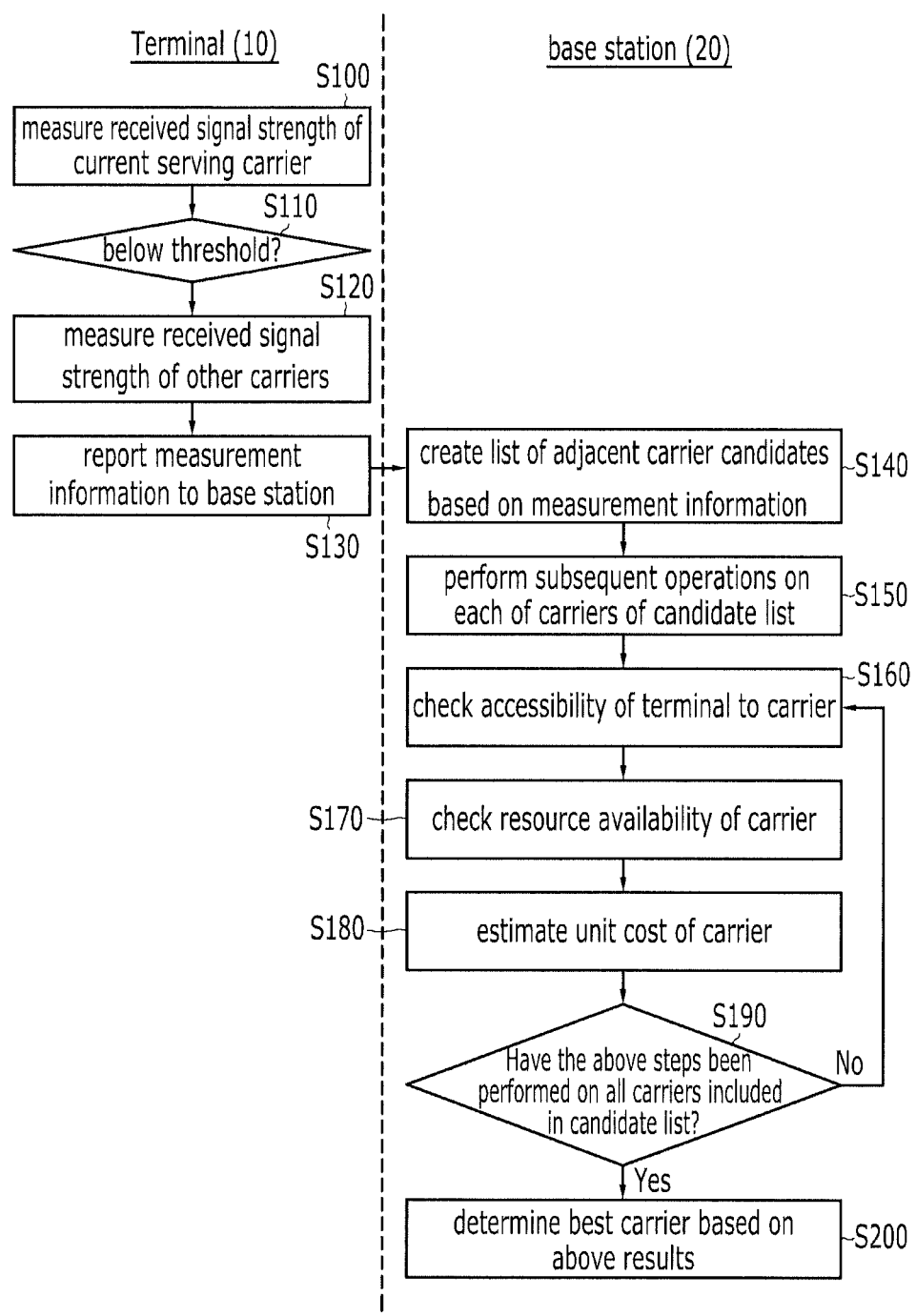
FIG. 6 is a flowchart of an intra inter-frequency handover method according to an exemplary embodiment of the present invention.

FIG. 6 is a flowchart of an intra-IFHO method according to an exemplary embodiment of the present invention.

As discussed above, the intra-IFHO method is a best carrier selection procedure for selecting other frequencies provided in the corresponding cell if a carrier serving in the current cell does not provide the continuous coverage of communication due to movement of the terminal 10.

As shown in the accompanying FIG. 6, the terminal 10 measures the received signal strength of a carrier currently in use (S100), and, if the measured received signal strength is below a set threshold, determines that the terminal 10 is out of the coverage of the corresponding carrier and thus fails to provide the continuity of communication (S110). In this case, the terminal 10 measures the received signal strength of signals corresponding to other carriers provided within the corresponding cell (S120), and transmits measurement information containing the measured received signal strength of other carriers to a base station 20 of the corresponding cell (S130).

Using the measurement information of each carrier transmitted from the terminal 10, the base station 20 creates a list of adjacent carrier candidates available to the terminal 10 (S140). Then, the best carrier for intra-IFHO is selected based on the created list of available adjacent carrier candidates (hereinafter, referred to as "candidate list" for the convenience of explanation). Here, the candidate list may include received signal strength and cell coverage that are measured corresponding to identification information for each measured carrier.

Next, the base station 20 performs the following operation on each of the candidate carriers included in the candidate list (S150). Specifically, accessibility to a certain carrier included in the candidate list is checked (S160). That is, it is determined whether the terminal 10 can access the corresponding carrier. For example, if the wireless protocol version of the terminal 10 is lower than a preset version, the base station 20 may determine that the terminal 10 cannot access a specific carrier. For example, a terminal of LTE Rel.8 wireless protocol version may not access a specific carrier NBC.

Moreover, the base station 20 checks available resources of the carriers included in the candidate list (S170). That is, it is determined whether the carriers can accept handover traffic by checking the resource availability of the carriers. Here, UE-AMBR (per User aggregate maximum bit rate) for each carrier, GBR (guaranteed bit rate) for each resource block RB, etc. can be used as a parameter for checking resource availability.

Further, the base station 20 estimates the unit costs of the carriers included in the candidate list (S180). In the unit cost estimation, the cost of frequency reconfiguration considering the cost charged for the use of a candidate carrier, the moving speed of the terminal, and the coverage of the corresponding carrier can be taken into account.

After performing these steps S160, S170, and S180 on all the carriers included in the candidate list (S190), checking is performed on each of the carriers. As a result of the checking, a carrier with the lowest unit cost is selected as the best carrier from among the carriers accessible to the terminal 10 and having sufficient available resources to accept handover traffic (S200). Afterwards, the base station 20 switches the current serving carrier of the terminal 10, i.e., a carrier providing no continuity of communication, to the selected best carrier.

The best carrier selected in the intra0IFHO procedure meets the following condition.

$$F(Sc)=F(x1,x2,x3,x4\ldots,xn), \quad \text{[Equation 1]}$$

where F( ) denotes a carrier selection function, in parameters considered in F, x1 denotes the accessibility of a component carrier, x2 denotes the resource availability of the component carrier, x3 denotes a unit cost per bandwidth of the component carrier, x4 denotes the received signal strength and cell coverage of the component carrier, and xn denotes other available parameters.

However, the carrier selection function according to an exemplary embodiment of the present invention is not limited to considering the aforementioned parameters, but may vary depending on communication service provider policies.

Meanwhile, as the base station 20 changes its serving carrier to the selected best carrier, the terminal 10 receives signals having the best carrier.

Figure 7:
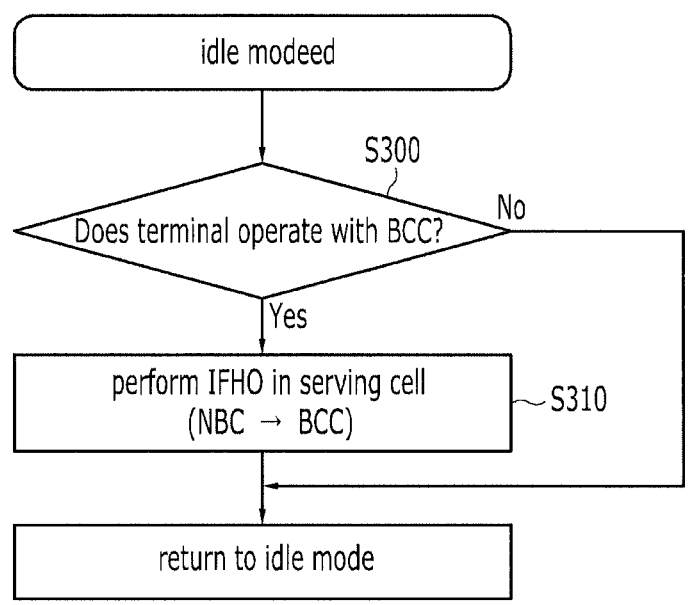
FIG. 7 is a flowchart showing a method for handover performed at a terminal operating in an idle mode according to an exemplary embodiment of the present invention.

FIG. 7 is a flowchart showing a method for handover performed at a terminal operating in an idle mode according to an exemplary embodiment of the present invention.

In the idle state, the terminal 10 has to maintain continuous coverage in order to support idle mode camping. To this end, the terminal 10 switches the current serving carrier to the primary carrier BCC.

Specifically, as shown in the accompanying FIG. 6, the terminal 10 checks the current serving carrier (S300), and, if the current serving carrier is not a primary carrier (BCC), switches the current serving carrier to a primary carrier capable of idle mode camping (S310). This process is performed by intra-inter frequency handover (Intra-IFHO), which is a procedure for switching from a certain carrier to other carriers within a cell, among the above-described handover procedure. On the other hand, if the current serving carrier is a primary carrier BCC, the current carrier is maintained as it is.

Next, a process of setting a handover type depending on the type of carrier used in each cell when a terminal moves from a serving cell to a target cell will be described.

Figure 8:
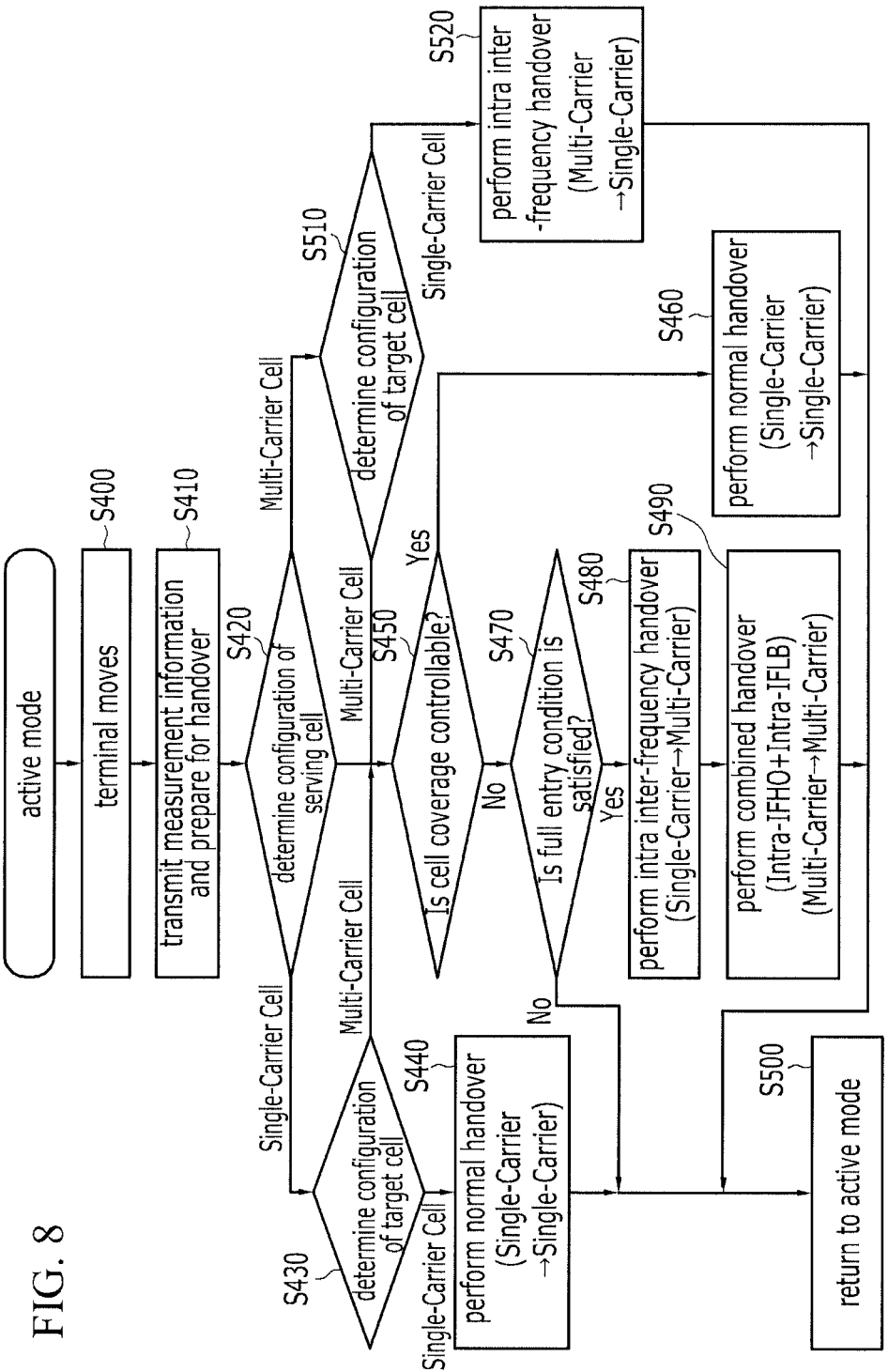
FIG. 8 is a flowchart showing a handover type setting process according to an exemplary embodiment of the present invention.

FIG. 8 is a flowchart showing a handover type setting process according to an exemplary embodiment of the present invention.

When the terminal 10 moves from a serving cell to a target cell in an active mode, the type of handover is determined depending on whether each of the carriers used in the serving cell and the target cell is a single carrier or multi-carrier.

As shown in the accompanying FIG. 8, when the terminal 10 moves from the serving cell to the target cell, it measures the received signal strength of the carrier being used and the carriers of adjacent cells and transmits measurement information including a measurement result to the serving cell (S400 and S410).

In a state where the received signal strength of the carrier of the current serving cell is below a set value, the serving cell sets, as a target cell, an adjacent cell having a carrier having the highest value of the received signal strengths among the carriers of the adjacent cells, and prepares for handover to the set target cell.

For handover purposes, the configuration of the serving is determined, that is, it is determined whether the carrier of the serving cell is a single carrier or multi-carrier (S420), and, as a result of the determination, it is determined whether the carrier of the target cell is a single carrier or multi-carrier (S430).

As a result of the determination, if the carrier of the serving cell is a single carrier and the carrier of the target cell is a single carrier, a normal handover is performed (S440).

On the contrary, if the carrier of the serving cell is a single carrier and the carrier of the target cell is a multi-carrier, it is determined whether coverage control and management are dynamically available to each carrier of the target cell (S450). As a result of determination, if the coverage of each carrier of the target cell is dynamically controllable, a normal handover is performed (S460). That is, when the transmission electric power of each carrier is dynamically controlled in real time according to communication service provider operation policies or the like and meets the requirement of continuous coverage between adjacent cells, a normal handover is performed without an intra-inter frequency handover process.

However, if the coverage of each carrier of the target cell is not dynamically controllable, it is determined whether the terminal 10 satisfies the condition of full entry to the target cell (S470). As used herein, the condition of full entry to the target cell refers to the condition in which the received signal strength Rs of the target cell shows no decrease during a set time Dt. The received signal strength Rs and set time Dt for determining this condition which can be variably set, are operation parameters that are dynamically set according to a system environment.

In the above step S470, if a multi-carrier is used for the target cell, and, although the coverage for each carrier cannot be dynamically controlled, the terminal 10 has fully entered the target cell, an inter-cell handover, i.e., an intra-IFHO is performed (S480). Specifically, a frequency handover from the single carrier of the serving cell to the multi-carrier of the target cell is performed. Then, as the terminal 10 moves within the fully entered target cell, a combined handover of intra-IFHO and intra-IFLB (Intra-IFHO+Intra-IFLB) is performed for frequency handover between the multiple carriers of the target cell (S490).

Meanwhile, in the above steps S450 and S470, if a multi-carrier is used for the target cell, the coverage for each carrier cannot be dynamically controlled, and the terminal 10 has not fully entered the target cell, no handover is performed but the terminal 10 returns to the active mode (S500).

On the other hand, in the step S420, if the carrier of the serving cell is a multi-carrier and the carrier of the target cell is a single carrier (S510), an intra-IFHO is performed. That is, a frequency handover from the multi-carrier of the serving cell to the single-carrier of the target cell is performed (S520).

On the contrary, if the carrier of the serving cell is a multi-carrier and the carrier of the target cell is a multi-carrier, it is determined whether coverage control and management are dynamically available to each carrier of the target cell as shown in the above steps S450 to S500, and handover is performed according to the result of the determination.

Next, there will be described in more detail a method for handover according to an exemplary embodiment of the present invention in the case of a handover type, among the above-described handover types, where a terminal moves from a serving cell operating with multiple carriers to a target cell operating with multiple carriers.

Figure 9:
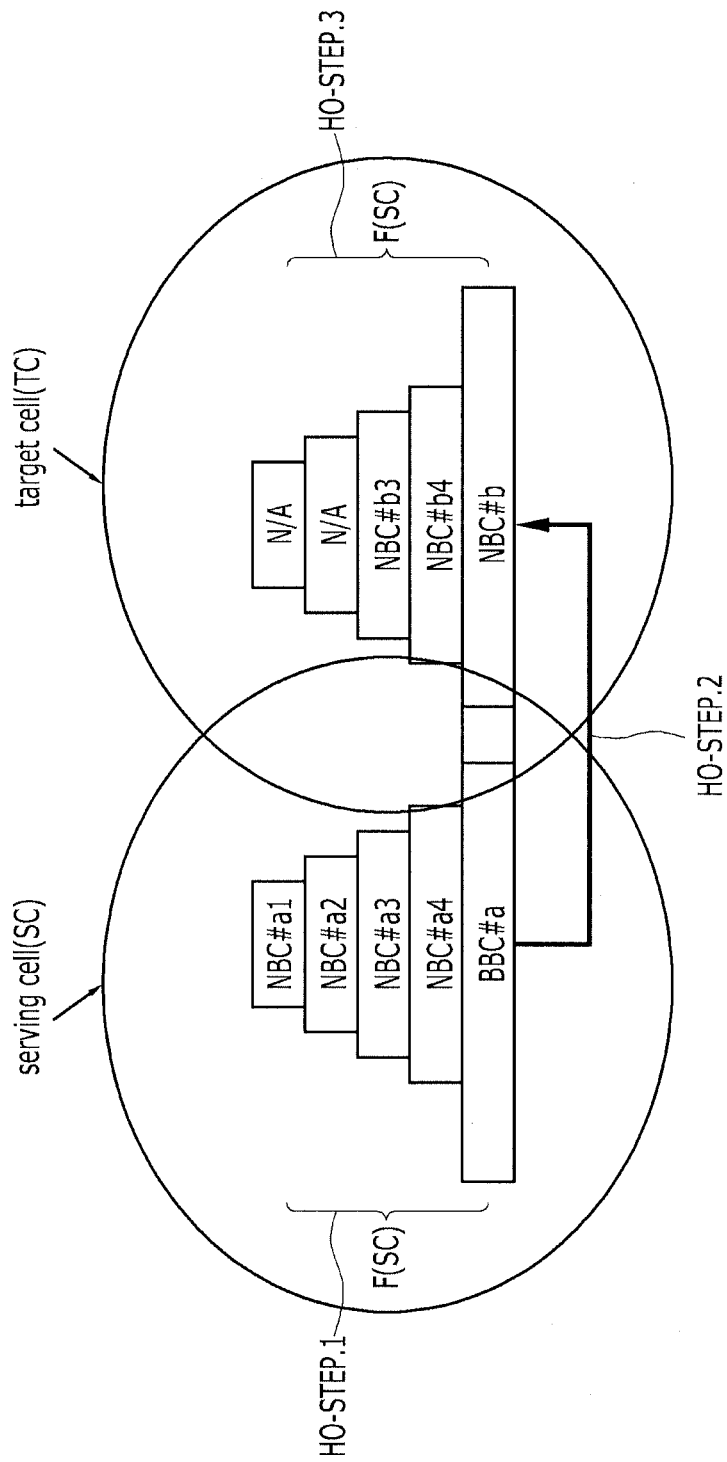
FIG. 9 is an illustration showing a handover process from a serving cell operating with multiple carriers to a target cell operating with multiple carriers according to an exemplary embodiment of the present invention.
Figure 10:
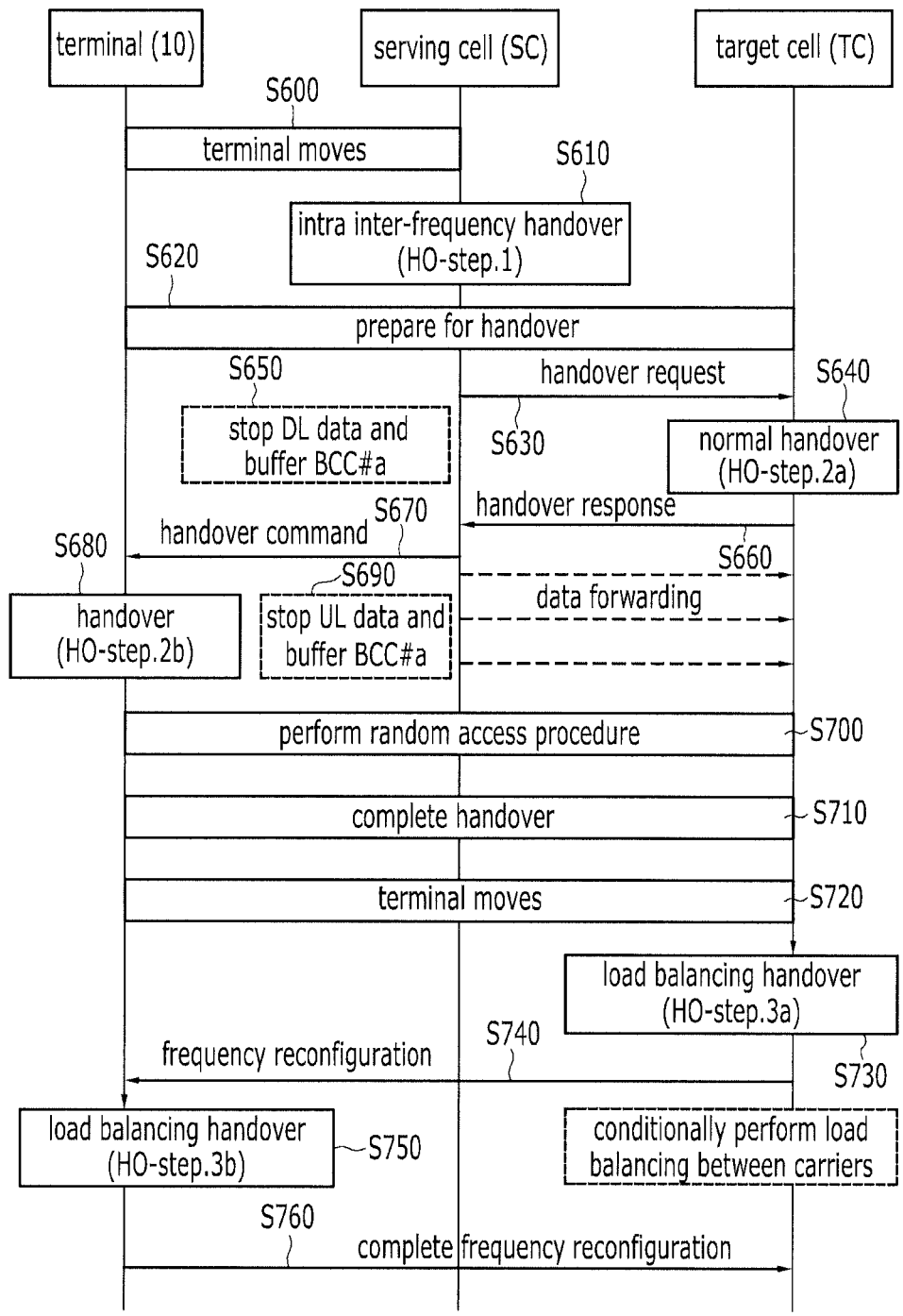
FIG. 10 is a detailed flowchart of the handover process illustrated in FIG. 9.

FIG. 9 is an illustration showing a handover process from a serving cell operating with multiple carriers to a target cell operating with multiple carriers according to an exemplary embodiment of the present invention, and FIG. 10 is a detailed flowchart of the handover process illustrated in FIG. 9.

As shown in the accompanying FIG. 9, when the terminal 10 moves from the serving cell SC operating with multiple carriers to the target cell TC operating with multiple carriers, firstly, an intra-IFHO is performed within the serving cell SC as the terminal 10 moves within the serving cell SC. That is, handovers such as NBC#a1→NBC#a2, NBC#a2→NBC#a3, NBC#a3→NBC#a4, and NBC#a4→BBC#a are performed based on the multiple carriers of the serving cell SC (HO-Step.1)

Next, the terminal 10 performs a normal handover to the target cell TC by using the primary carrier BCC#a of the serving cell SC. That is, a normal handover from the primary carrier BCC#a of the serving cell SC to the primary carrier BCC#b of the target cell TC is performed (HO-Step.2). At this point, the primary carriers BCC#a and BCC#b serve as carriers that enable continuous coverage between the serving cell SC and the target cell TC.

Afterwards, when the terminal 10 has fully entered the target cell TC, the terminal 10 performs an intra-IFHO and an intra-FLB between the multiple carriers available to the target cell TC (HO-Step.3)

Such a handover process will be described in more detail based on FIG. 10.

As shown in the accompanying FIG. 10, the terminal 10 performs an intra-IFHO as it moves out of the serving cell SC in the direction of the target cell TC (HO-Step.1) (S600 and S610). That is, a handover from the secondary carrier NBC#a to the primary carrier BCC#a among the multiple carriers of the serving cell SC is performed.

Next, the terminal 10 performs a normal handover from the serving cell SC to the target cell TC by using the primary carrier. That is, a normal handover from the primary carrier BCC#a of the serving cell SC to the primary carrier BCC#b of the target cell TC is performed. At this point, the primary frequencies BCC#a and BCC#b serve as carriers that enable continuous coverage between the serving cell SC and the target cell TC.

Specifically, when the serving cell SC of the terminal 10 requests a handover to the target cell TC (S620 and S630), the target cell TC sends a handover response indicating the primary carrier BCC#b of the target cell TC (S640). Meanwhile, the serving cell SC stops the transmission of downlink data DL provided to the terminal 10 after requesting the handover, and buffers data received at the primary carrier BCC#a (S650). In this state, when the serving cell SC receives the handover response from the target cell TC, it commands the terminal 10 to perform handover to the primary carrier BCC#b of the target cell (S660 and S670).

In response to the handover command from the serving cell SC, the terminal 10 performs frequency reconfiguration, i.e., an operation for switching the current carrier from the primary carrier BCC#a of the serving cell to the primary carrier BCC#b of the target cell (S680). At this point, the terminal 10 stops uplink data transmission to the serving cell SC and buffers data to be transmitted at the primary BCC#a (S690). Meanwhile, the serving cell SC forwards data related to the terminal 10 to the target cell TC. Afterwards, the terminal 10 performs a random access procedure for a connection to the target cell TC and completes the handover to the target cell TC (S700 and S710).

As the terminal 10 moves into the target cell TC after completing the entry to the target cell TC from the serving cell SC (S720), if intra inter-frequency load balancing (Intra-IFLB) is possible between the multiple carriers available to the target cell, i.e., the current serving cell TC, the current serving cell TC performs frequency reconfiguration. The current serving cell TC performs a load balancing function between the multiple carriers via dedicated signaling (e.g., RRC Connection Reconfiguration and RRC Connection Reconfiguration Complete) to the terminal 10 (S730).

Specifically, as the terminal 10 moves, the current serving cell TC commands the terminal 10 to perform frequency conversion from the current primary BCC#b to the secondary carrier (e.g., BCC#b1), which is one of the multiple carriers used in the serving cell (S740). Accordingly, the terminal 10 switches the current serving frequency from the primary BCC#b to the secondary carrier BCC#b1, and, upon completion of the switching operation, reports this to the current serving cell T (S750 and S760).

Signaling procedures (e.g. Signaling Radio Bearer (SRB)) for the handover performed in each cell may be performed based on the primary carrier (BCC) of the corresponding cell.

According to an exemplary embodiment of the present invention, in a wireless communication system that operates with multiple carriers, handover is performed using a primary carrier even if each carrier has a different cell coverage, thereby ensuring the continuity of coverage between adjacent cells. Accordingly, communication interruption caused by handover between multiple carriers can be prevented.

Moreover, every signaling within a system having multiple carriers is forwarded through a primary carrier, thereby simplifying the handover signaling scheme and reducing the signaling overhead.

The exemplary embodiments of the present invention are not implemented only by a device and/or method, but can be implemented through a program for realizing functions corresponding to the configuration of the exemplary embodiments of the present invention and a recording medium having the program recorded thereon. Such implementation can be easily made by a skilled person in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for handover between cells using a plurality of carriers, the method comprising:
    measuring, by a terminal in a serving cell, a received signal strength of a carrier currently being used by the terminal in the serving cell and a received signal strength of carriers of cells adjacent to the serving cell;
    when the received signal strength of the carrier currently being used by the terminal in the serving cell is below a threshold value, performing a handover for the terminal to a target cell, the target cell being an adjacent cell including a carrier having a highest measured value of received signal strength among the adjacent cells;
    when the terminal has entered the target cell by handover, selecting a best carrier from among carriers available in the target cell to enable the terminal to perform frequency conversion to the best carrier; and
    performing a frequency load balancing procedure for allowing the target cell to distribute traffic of a certain carrier to adjacent carriers,
    wherein the type of handover performed is based on whether a carrier of the serving cell is a single carrier or a multi-carrier and whether a carrier of the target cell is a single carrier or a multi-carrier, and in the performing of a handover, the carrier of the terminal is switched to a primary carrier of the target cell.

2. The method of claim 1, wherein, in the frequency conversion, the best carrier is selected from among carriers available to the terminal in the corresponding cell based on at least one of accessibility of the terminal to a carrier, resource availability of a carrier, and unit cost of a carrier, and the terminal is requested to switch to the selected best carrier.

3. The method of claim 1, wherein a signaling procedure performed in each cell is performed based on a primary carrier of a corresponding cell.

4. The method of claim 1, further comprising:
    checking, by the terminal in an idle mode, a current operating carrier; and
    when the checked carrier is not a primary carrier of a current cell in which the terminal is positioned, switching the operating carrier to the primary carrier of the current cell.

5. The method of claim 1, wherein carriers of each cell have a different cell coverage.

6. A method for handover of a terminal from a serving cell to a target cell, the method comprising:
    when the target cell includes one primary carrier and at least one secondary carrier,
    determining whether a cell coverage control of each carrier used in the target cell is possible;
    when the cell coverage control is not possible and the terminal has entered the target cell, performing an intra inter-frequency handover (intra-IFHO) procedure for selecting a best carrier from among carriers with which the terminal operates and enabling the terminal to operate based on the best carrier; and
    when the cell coverage control is possible, performing a handover for switching a carrier with which the terminal operates to the primary carrier of the target cell.

7. The method of claim 6, wherein, in the performing of the intra-IFHO procedure, the terminal performs the intra-IFHO procedure when a condition that signal strength received by the target cell does not decrease during a set time is satisfied.

8. The method of claim 6, wherein, when the serving cell uses a plurality of carriers and the target cell uses a plurality of carriers, the performing of the intra-IFHO procedure further comprises performing a frequency load balancing procedure for allowing the target cell to distribute traffic of a certain carrier to adjacent carriers.

* * * * *